(12) United States Patent
Arnedo et al.

(10) Patent No.: US 6,829,983 B2
(45) Date of Patent: Dec. 14, 2004

(54) ELECTRIC TOASTER

(75) Inventors: Julian Arnedo, Barcelona (ES); Antonio Basora, Barcelona (ES)

(73) Assignee: SEB S. A., Ecully (FR)

( * ) Notice: Subject to any disclaimer, the term of this patent is extended or adjusted under 35 U.S.C. 154(b) by 0 days.

(21) Appl. No.: 10/477,555

(22) PCT Filed: May 6, 2002

(86) PCT No.: PCT/FR02/01553
§ 371 (c)(1),
(2), (4) Date: Nov. 13, 2003

(87) PCT Pub. No.: WO02/091892
PCT Pub. Date: Nov. 21, 2002

(65) Prior Publication Data
US 2004/0149141 A1 Aug. 5, 2004

(30) Foreign Application Priority Data
May 14, 2001 (FR) .............................. 01 06680

(51) Int. Cl.⁷ .............................................. A47J 37/08
(52) U.S. Cl. .................. 99/327; 99/329 P; 99/329 RT; 99/385; 99/389; 99/391
(58) Field of Search .......................... 99/326–333, 385, 99/389–393, 399, 400, 401; 219/521, 524, 492, 494, 497, 518, 525

(56) References Cited

U.S. PATENT DOCUMENTS

| | | | | |
|---|---|---|---|---|
| 5,072,662 A | * | 12/1991 | Yip | 99/327 |
| 5,647,270 A | * | 7/1997 | Rousseau et al. | 99/327 |
| 5,664,483 A | * | 9/1997 | Yip | 99/391 |
| 5,746,115 A | * | 5/1998 | Yip | 99/339 |
| 5,771,780 A | * | 6/1998 | Basora et al. | 99/327 |
| 5,901,638 A | * | 5/1999 | Houel | 99/327 |
| 6,116,149 A | * | 9/2000 | Benedictus et al. | 99/329 P |
| 6,205,910 B1 | * | 3/2001 | Vaughn | 99/326 |
| 6,250,212 B1 | * | 6/2001 | Yeung et al. | 99/391 |
| 6,415,709 B1 | * | 7/2002 | Jackson | 99/391 |
| 6,431,057 B1 | * | 8/2002 | Leung et al. | 99/326 |
| 6,502,502 B1 | * | 1/2003 | Sutton et al. | 99/391 |

FOREIGN PATENT DOCUMENTS

| | | |
|---|---|---|
| EP | 0 845 235 | 11/1997 |
| FR | 2729285 | 7/1996 |

* cited by examiner

Primary Examiner—Timothy F. Simone
(74) Attorney, Agent, or Firm—Browdy and Neimark, P.L.L.C.

(57) ABSTRACT

The invention relates to a toaster in which the housing (1) comprises: a toasting chamber (2); a toast rack (5), which can move vertically inside said chamber (2) between an eject position and a toasting position; a driver (6), which is linked to the toast rack (5), is slide mounted on a vertical column (7) and is used to lower the toast rack (5) from the eject position, in which the driver (6) is returned by an elastic means (9), to the toasting position, in which the driver (6) is held in place by an unlockable means (10); and a rising damping device comprising a piston (16) which can slide vertically along a determined path in a housing (17) that is solidly connected to the drive and the upper face of which can come into contact with a stop end (19) located in the top part of the housing (1). According to the invention, the housing (17) is tubular and the piston (16) of the damping device is also formed by a tubular part, said housing (17) and piston (16) being coaxially mounted around the vertical column (7).

8 Claims, 6 Drawing Sheets

ELECTRIC TOASTER

The present invention concerns a toaster, the housing of which has a toasting chamber presenting an upper opening for the introduction of bread and enclosing at least one electric heating element, at least one toast rack moveable vertically in the chamber between an ejection position and a toasting position, a driver linked to the toast rack, slidably mounted on a vertical column, and having a handle permitting lowering of the toast rack from the ejection position, in which the driver is returned by an elastic means, to the toasting position in which the driver is retained by an unlockable means and in which a finger fixed to the driver closes an end of travel switch.

The invention particularly concerns a toaster of which the driver is equipped with a damper of rising movement comprising a piston sliding vertically in a housing fixed to the driver on a predetermined path and the upper face of which can come in contact with an abutment situated in the housing, as well as an elastic means disposed between said piston and the driver.

Such a damper mounted on the driver of a toaster is described in French Patent FR 9500377 in the name of the applicant. However, the damper described is not entirely satisfactory since it increases the complexity and the space occupied by the driver. In addition, this device does not supply an effective solution to the problem of sliding of the driver along the vertical column. In effect, in order to obtain a trouble free functioning of the toaster, it is necessary to assure that the driver slide along the column without risk of blockage.

In this goal, the vertical column can be lubricated with grease. But this solution is not easy to implement during fabrication of the toaster and the durability of the grease is not sufficiently reliable, particularly because of the proximity of the heating elements.

Another solution, described in the patent FR9500377, consists in equipping the driver with guide wheels that bear on the vertical column. The use of these wheels increases the number of parts and the complexity of the driver, and consequently its fabrication cost.

The goal of the present invention is to remedy these drawbacks by providing a toaster driver equipped with a damper that slides perfectly along the vertical column while retaining a reduced size and number of pieces.

According to the invention, the housing of the driver being tubular, and the piston of the damper being formed of a piece that is also tubular, said housing and piston are mounted coaxially around the vertical column. The damper thus arranged does not increase the size of the driver and the vertical guidance is achieved by the piston.

In an advantageous manner, the height H of the piston of the damper is greater than the height h of the driver to reduce friction and thus the risks of blockage of the piston on the column.

The tubular piece forming the piston of the damper has, preferably, respectively at its upper and lower ends, two bearings in contact with the vertical column in order to improve the sliding of the piston along the column and to tolerate a slight linearity deformation of the column.

Other characteristics and advantages of the invention will appear from the description that will follow given by way of non-limiting example, with reference to the attached drawings in which.

Figure 1:
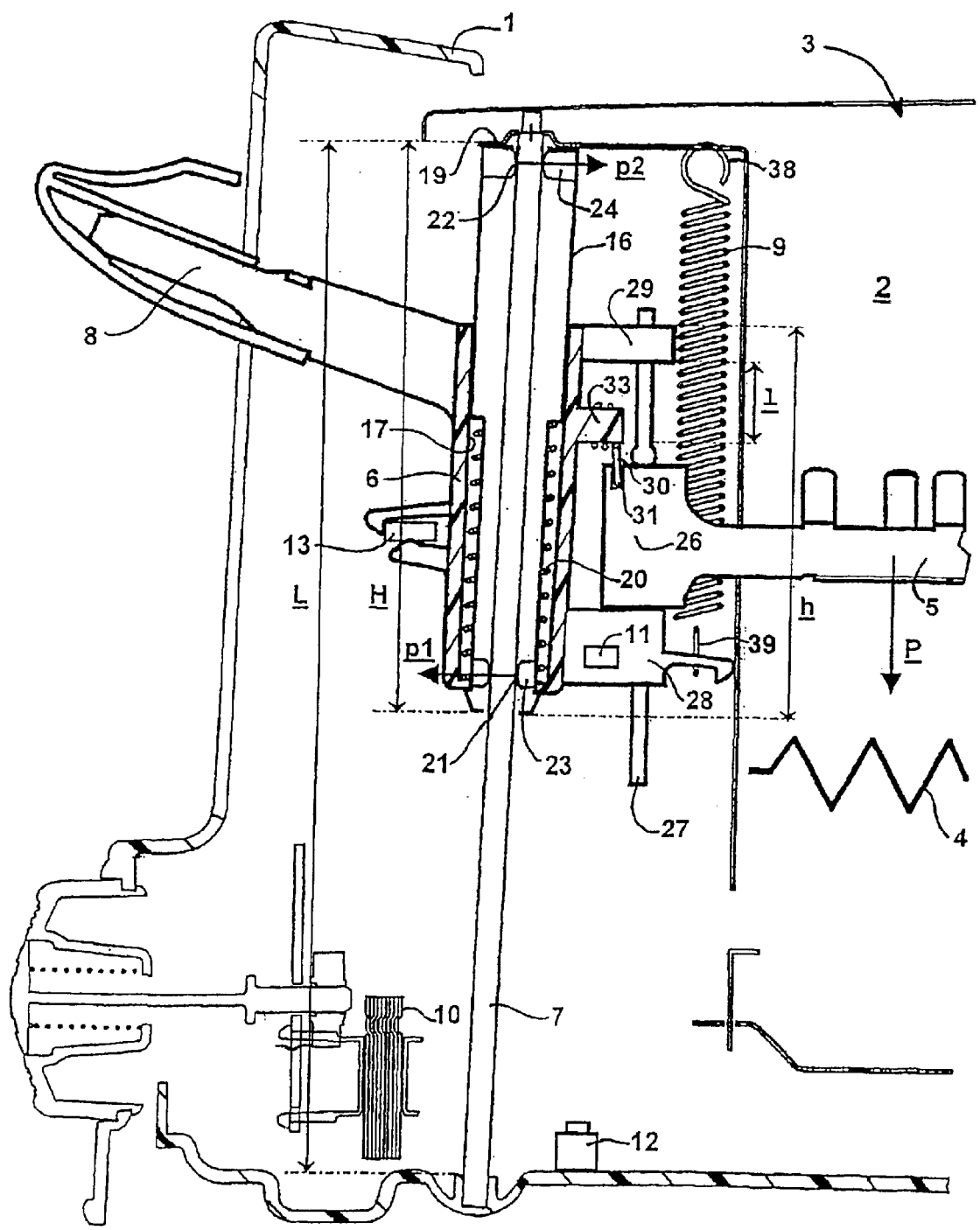
FIG. 1 is a simplified partial cross-sectional view of a toaster according to the invention in which the toast rack is in the ejection position.
Figure 2:
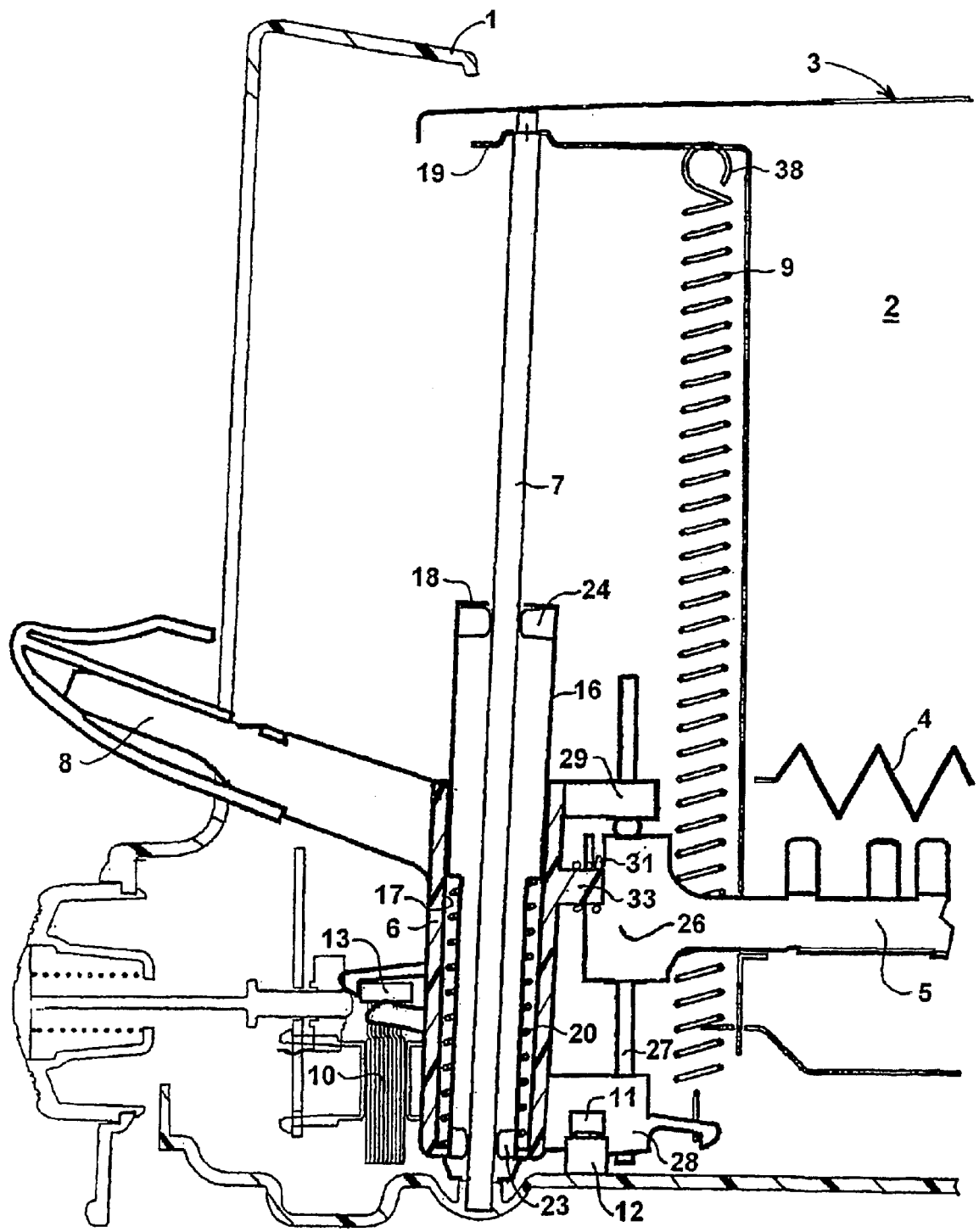
FIG. 2 is a view similar to that of FIG. 1 in which the toast rack is in the toasting position.

In FIG. 1, there is represented a toaster, the housing 1 of which has a toasting chamber 2 presenting an upper opening 3 for the introduction of bread slices and enclosing at least one electric heating element 4, at least one toast rack 5 vertically moveable in chamber 2 between an ejection position, represented in FIG. 1, and a toasting position represented in FIG. 2. A driver 6, linked to toast rack 5 and slidably mounted on a vertical column 7, has a handle 8 permitting lowering of toast rack 5 from the ejection position, into which driver 6 is urged by an elastic means 9 to the toasting position in which the driver 6 is retained by an unlockable means 10 and in which a finger 11 fixed to the driver closes an end of travel switch 12.

In a known manner, heating element 4 is constituted by an electric resistance or a quartz tube. For the elastic return means 9 one can utilize a coil spring having a stiffness sufficient to return toast rack 5 carrying bread slices and driver 6 to the ejection position at the end of a toasting operation. The unlockable retaining means for retaining driver 6 in the toasting position can comprise an electromagnet 10 adapted to hold a ferromagnetic piece 13 fixed to the driver. The end of travel switch 12 serves to deliver a signal indicating the start of a toasting operation to control means of the toaster. Electromagnet 10 is then supplied with current until a time counter or a browning sensor supplies a signal indicating the end of the toasting operation. In the embodiment described, the end of travel switch 12 also serves to supply heating element 4 as long as driver 6 is in the toasting position.

Driver 6 is equipped with a rising movement damper comprising a piston 16 sliding vertically in a housing 17 fixed to the driver over a predetermined path and the upper face 18 of which can contact an abutment 19 situated in the upper part of housing 1, as well an elastic means 20 disposed between said piston 16 and driver 6. This arrangement permits damping of the return of the toast rack into the ejection position in order to avoid expulsion of the bread slices toward the outside of the toaster. The damping of the driver also permits a reduction of disagreeable noises and vibration that can possibly deteriorate the heating element if it is a matter of a quartz tube.

According to the invention, housing 17 of the driver being tubular and piston 16 of the damper being formed of a part that is also tubular, said housing 17 and piston 16 are mounted coaxially around vertical column 7. Due to this arrangement, piston 16 of the damper can slide along vertical column 7 and guide the vertical movement of driver 6. In addition, the damper thus arranged does not increase the size of driver 6.

In an advantageous manner, the height H of piston 16 of the damper is greater than the height h of driver 6. This increases the distance between the contact points (21, 22) of piston 16 with vertical column 7; a distance that is then substantially equal to the height H of the piston. This distance being greater, the pressures p1 and p2 exerted at the points of contact (21, 22) with column 7 are smaller for a constant weight P supported by the toast rack. Thus, the risks of blockage of the piston on the column are diminished.

It is important to note that despite the height H of the piston greater than the height h of the driver, the useful vertical travel of the toast rack remains substantially equal to the path L-h that one can obtain with a driver not furnished with a damper, L representing the height of column 7. In effect, the rack can pass from the toasting position represented in FIG. 2 to the position represented in FIG. 4 in which upper face 18 of piston 16 is practically at the level of the upper face of the driver. This position will be described in detail herebelow.

The tubular part forming piston 16 of the damper can have, respectively at its lower and upper ends at the points of contact (21, 22), two bearings (23, 24) in contact with vertical column 7 in order to improve the sliding of piston 16 along the column and to tolerate a slight deformation of the column.

Figure 4:
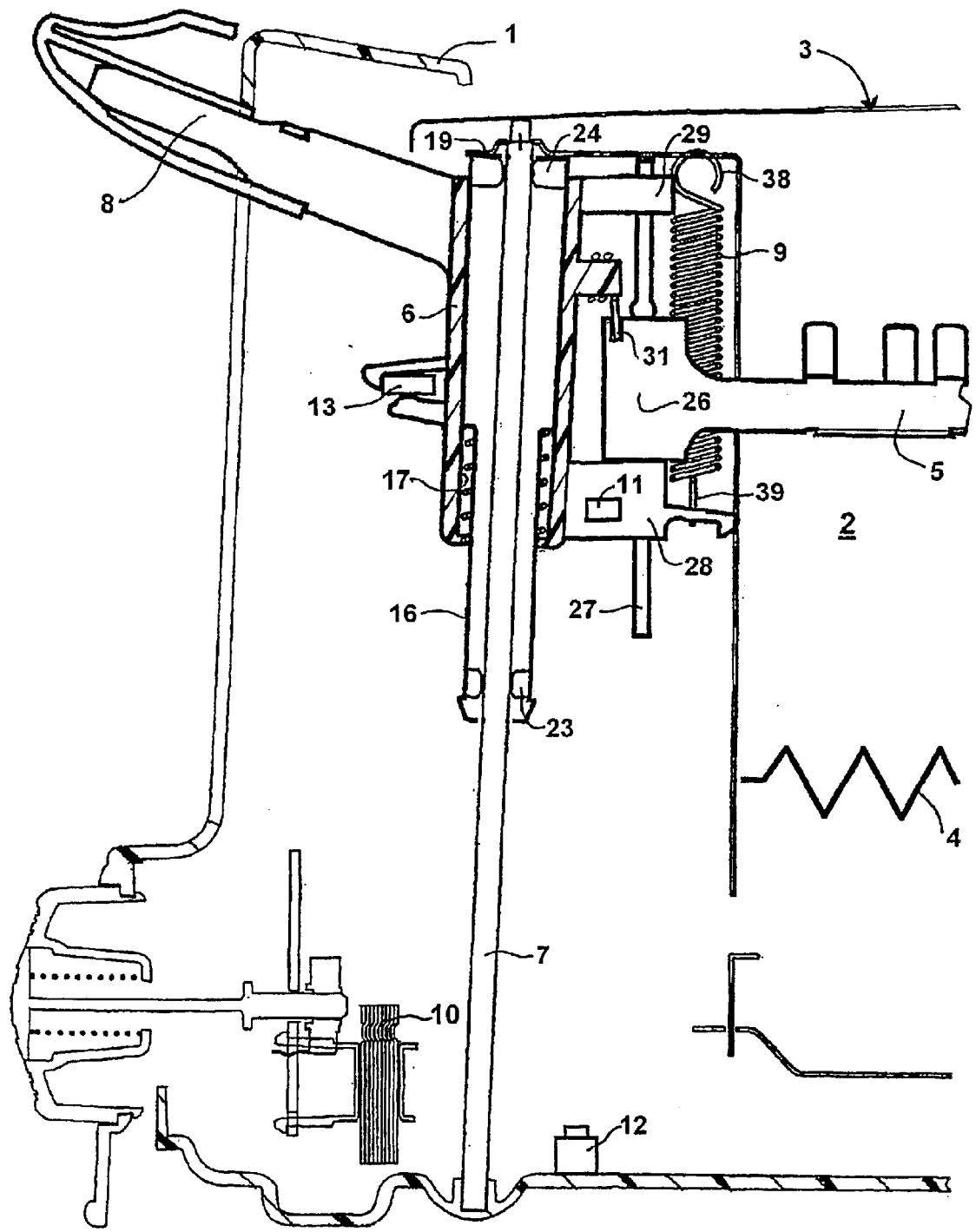
FIG. 4 is a view similar to FIG. 1 in which the toast rack is in a heightened position.

Preferably, the stiffness and the arrangement of elastic means 20 of the damper are determined in a manner to permit compression of the damper from the ejection position, represented in FIG. 1, to a heightened position, represented in FIG. 4, by exerting a pushing force toward the top on handle 8 of driver 6. This arrangement permits a large part of the bread slices to be maintained in the toasting enclosure in order to keep them warm when the toaster is in the ejection position. Then, the user can increase the amount by which the bread slices extend out of the toaster by exerting a pulling force toward the top on the handle in order to grip the slice more easily without risk of burning.

Figure 3:
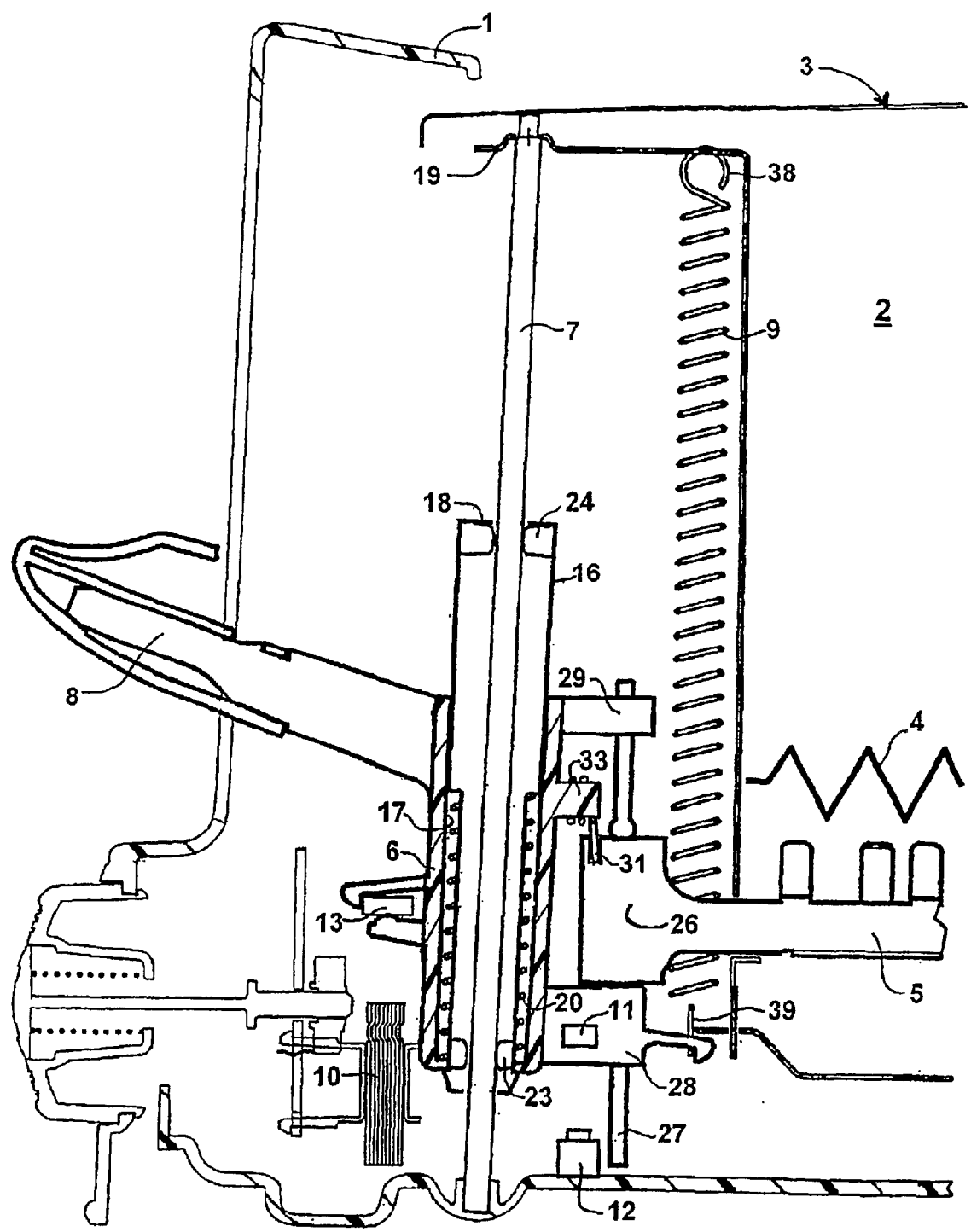
FIG. 3 is a view similar to FIG. 1 in which the toast rack is in the safety position.

The reduced size thus achieved for driver 6 permits a particular installation of the driver on toast rack 5 in order to increase the operating safety of the toaster. For this goal, the driver is mounted to be moveable relative to the end 26 of toast rack 5 along a predetermined path 1 in order to occupy a safety position, represented in FIG. 3, in which finger 11 of the driver frees the end of travel switch 12 after unlocking of retaining means 10, even if toast rack 5 is blocked in the toasting position. Thus, even if a bread slice blocks rack 5 in the toasting position, freeing of the end of travel contact 12 turns off the supply of heating element 4 and all risk of burning of the bread is avoided.

In the embodiment described, end 26 of the rack is movably mounted on an axis 27 between a lower abutment 28 and an upper abutment 29 fixed to driver 6 and which determine the path 1 in the toasting position, upper abutment 29 comes practically into contact with the rack, while in the safety position, lower abutment 28 comes in contact with the rack under the action of the elastic return means 9 of the driver in the ejection position.

It is possible to increase the return force of driver 6 into the safety position by providing a helical compression spring, not shown, around axis 27 between upper abutment 29 and rack 5.

Figure 5:
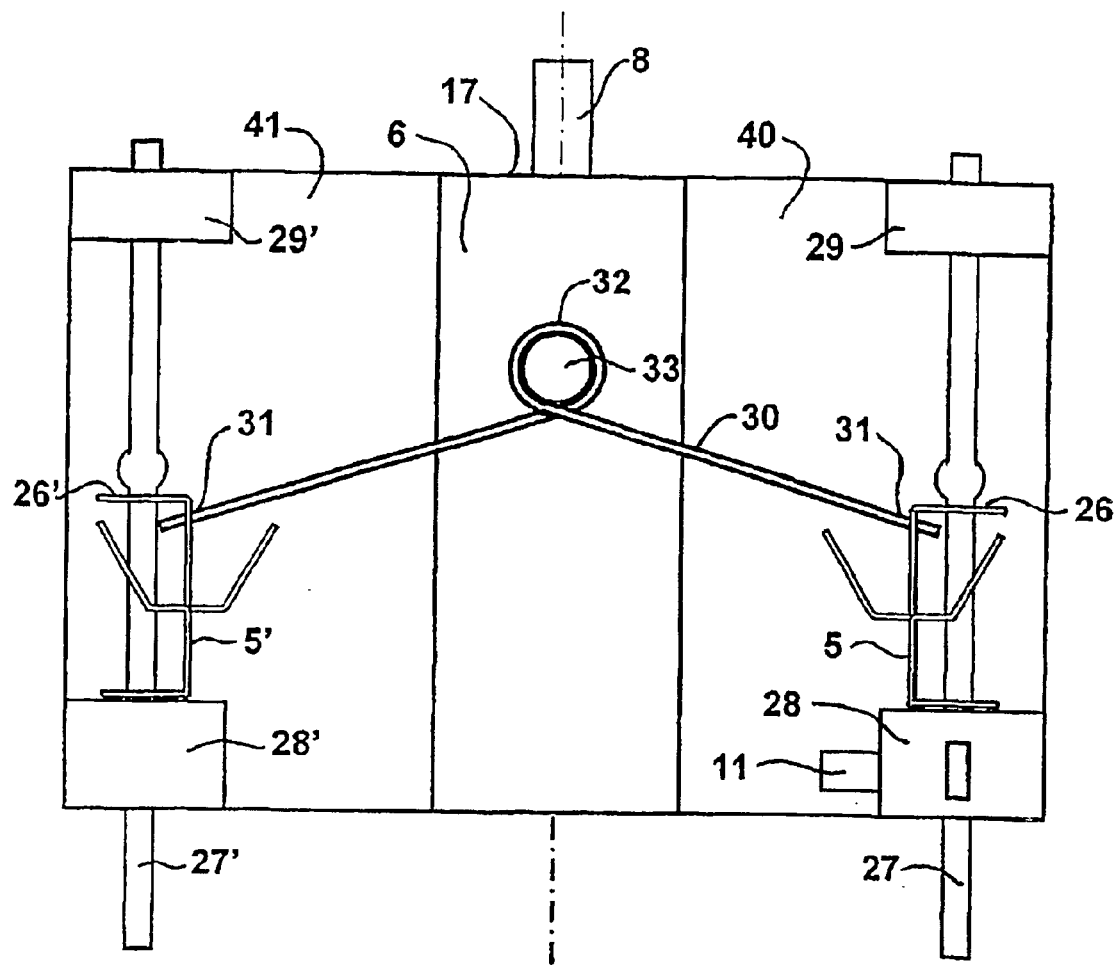
FIG. 5 is a schematic view of a driver linked to two toast racks constructed according to the invention.

In the case of a toaster having two toast racks (5, 5') disposed in parallel, the driver, represented schematically in FIG. 5, has two wings (40, 41) extending from each side of housing 17 of the damping piston and on which are movably mounted the end (26, 26') of the two toast racks (5, 5'), each wing having an axis (27, 27') disposed between a lower abutment (28, 28') and an upper abutment (29, 29').

However, the solution described previously to return the driver to the safety position imposes in this case the use of two compression springs. As shown in the figures, it is then advantageous to return driver 6 into the safety position due to a single elastic torsion spring 30 the middle part 32 of which is fixed to driver 6 and the ends 31 of which exert a pressure on the upper face of the two toast racks (5, 5'). Middle part 32 of the spring can have several turns mounted on a boss 33 of the driver.

With the goal of simplifying the construction of the driver and thus of reducing the fabrication costs, the two wings (40, 41) and housing 17 of driver 6 are made of a single piece of molded plastic material.

Figure 6:
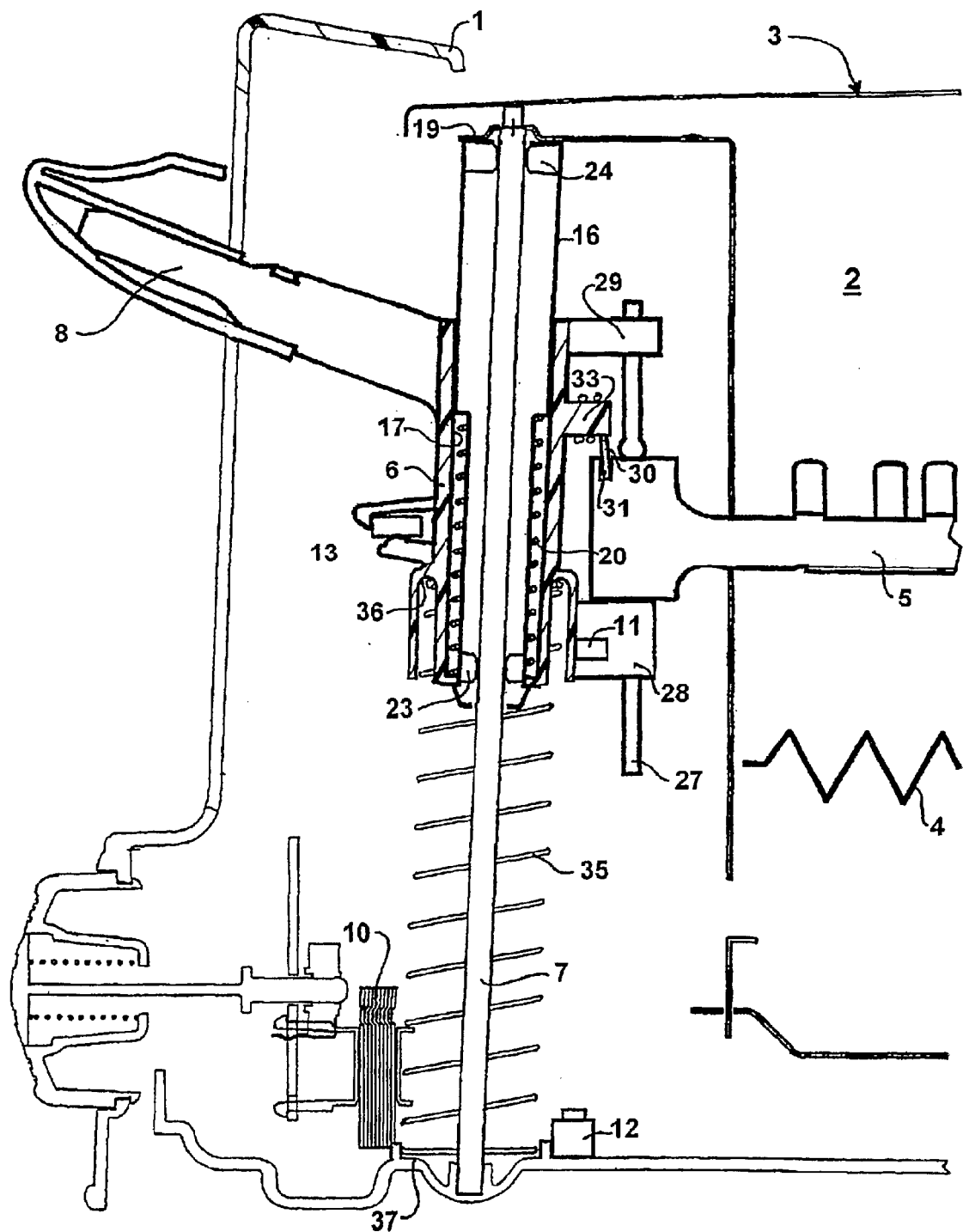
FIG. 6 is a simplified partial cross-sectional view of a second embodiment of the toaster according to the invention.

According to a particular embodiment represented in FIG. 6, the elastic means for returning the driver to the ejection position comprises a compression spring 35 disposed coaxially to vertical column 7 between lower face 36 of driver 6 and the bottom 37 of the housing. This arrangement limits the size of the totality of the mechanism for raising the toast rack. The force exerted on the driver by the spring thus arranged is coaxial to vertical column 7 which limits friction at the points of contact (21, 22) of piston 16 on column 7. In addition, the installation of this compression spring 35 is easier than the installation of coiled tension spring 9 since it is sufficient to thread it onto the column instead of fixing the two hooks (38, 39) to the housing and to the driver.

The toaster thus constructed has a driver furnished with a damper sliding perfectly from the toasting position to the ejection position, and this without increasing the complexity and the size of the device.

What is claimed is:

1. A toaster, the housing (1) of which has a toasting chamber (2) presenting an upper opening (3) for the introduction of bread and enclosing at least one electric heating element (4), at least one toast rack (5) moveable vertically in the chamber (2) between an ejection position and a toasting position, a driver (6) linked to the toast rack, slidably mounted on a Vertical column (7), and having a handle (8) permitting lowering of the toast rack (5) from the ejection position, in which the driver (6) is returned by an elastic means (9), to the toasting position in which the driver (6) is retained by an unlockable means (10) and in which a finger (11) fixed to the driver closes an end of travel switch (12), as well as a rising movement damper comprising a piston (16) sliding vertically in a housing (17) fixed to the driver over a predetermined path and the upper face (18) of which can contact an abutment (19) situated in the upper part of the housing (1), as well an elastic means (20) disposed between said piston (16) and the driver (6), characterized in that the housing (17) being tubular and piston (16) of the damper being formed of a part that is also tubular, said housing (17) and piston (16) are mounted coaxially around the vertical column (7).

2. Toaster according to claim 1, characterized in that the height (H) of the piston (16) of the damper is greater than the height (h) of the driver (6).

3. Toaster according to claim 2, characterized in that the tubular part forming the piston (16) of the damper can have, respectively at its lower and upper ends at the points of contact (21, 22), two bearings (23, 24) in contact with the vertical column (7).

4. Toaster according to claim 2, characterized in that the stiffness and the arrangement of the elastic means (20) of the damper are determined in a manner to permit compression of the damper from the ejection position to a heightened position by exerting a pushing force toward the top on the handle (8) of the driver (6).

5. Toaster according to claim 1, characterized in that the driver (6) is mounted to be moveable relative to the end (26) of the toast rack (5) along a predetermined path (1) in order to occupy a safety position in which the finger (11) of the driver frees the end of travel switch (12) after unlocking of the retaining means (10), even if the toast rack (5) is blocked in the toasting position.

6. Toaster according to claim 5, the driver (6) of which is movably mounted relative to the ends (26, 26') of the two toast racks (5, 5') disposed in parallel, characterized in that the driver (6) is returned into the safety position by a single elastic torsion spring (30) the middle part (32) of which is fixed to the driver (6) and the ends (31) of which exert a pressure on the upper face of the two toast racks (5, 5').

7. Toaster according to claim 6, characterized in that the driver (6) has two wings (40, 41) extending from each side of the housing (17) of the damping piston (16) and on which are movably mounted the end (26, 26') of the two toast racks (5, 5'), said wings and the housing of the driver are made of a single piece of molded plastic material.

8. Toaster according to claim 1, characterized in that the elastic means for returning the driver (6) to the ejection position comprises a compression spring (35) disposed coaxially to the vertical column (7) between the lower face (36) of the driver and the bottom (37) of the housing (1).

* * * * *